United States Patent [19]

French et al.

[11] 3,791,811
[45] Feb. 12, 1974

[54] STORABLE HIGHLY CONCENTRATED PESTICIDES AND PROCESS FOR THEIR MANUFACTURE

[75] Inventors: Heinz French; Konrad Albrecht, both of Frankfurt am Main; Eugen Schafer, Hofheim, Taunus, all of Germany

[73] Assignee: Farbwerke Hoechst Aktiengesellschaft vormals Meister Lucius and Bruning, Frankfurt Main, Germany

[22] Filed: Jan. 14, 1970

[21] Appl. No.: 4,174

Related U.S. Application Data

[63] Continuation of Ser. No. 746,507, July 22, 1968, abandoned.

[30] Foreign Application Priority Data

July 28, 1967 Germany.............................. 53083

[52] U.S. Cl............................ 71/120, 71/65, 71/79, 71/97, 71/DIG. 1, 424/246, 424/276, 424/286, 424/288, 424/314, 424/349, 424/357, 424/358, 424/359, 424/361, 424/362, 424/365
[51] Int. Cl................................................ A01n 9/20
[58] Field of Search. 71/120, DIG. 1; 424/349, 288, 424/276, 246, 309, 357, 361, 362

[56] References Cited
UNITED STATES PATENTS 3,657,446  4/1972  Blackmore..................... 71/DIG. 1
3,079,244  2/1963  Scherer et al..................... 71/120
3,175,948  3/1965  Koff et al............................ 424/357
3,157,486  11/1964 Harrison et al........................ 71/79
3,231,413  1/1966  Berquin................................ 71/64
3,227,657  1/1966  Haden, Jr. et al................. 424/357
3,356,569  12/1967 Nicodemus et al................ 424/329
3,234,002  2/1966  Weed................................... 71/120
3,278,373  10/1966 Baker................................. 424/246

FOREIGN PATENTS OR APPLICATIONS 1,285,930  1/1962  France................................. 71/120
638,296   4/1964  Belgium.............................. 71/112

OTHER PUBLICATIONS

Endosulfan, Chem. Week, 5/25/63, p. 133.

Morocide, Chem. Week, 5/25/63, p. 143.

Brestan, Chem. Week, 6/1/63, p. 63.

PCNB, Chem. Week, 6/1/63, p. 70.

Primary Examiner—Lewis Gotts
Assistant Examiner—G. Hollrah
Attorney, Agent, or Firm—Curtis, Morris and Safford

[57] ABSTRACT

The invention provides highly concentrated preparations of pesticidal formulations and their manufacture by means of a wet-grinding and spray-drying process.

12 Claims, No Drawings

STORABLE HIGHLY CONCENTRATED PESTICIDES AND PROCESS FOR THEIR MANUFACTURE

This application is a continuation of application Ser. No. 746,507, filed July 22, 1968, now abandoned.

Commercial pesticides in the form of wettable powders — for actual use in the form of their aqueous suspension — are as a rule manufactured by repeated dry grinding of the active substance and carrier substances as well as further additives such as grinding aids and the like, and subsequent mixing of the powder with wetting agents and/or dispersing agent. The intensive grinding is necessary in order to achieve a material which meets the international standards as to the storability and suspending properties of such agents.

Wettable powders manufactured in the above manner have a maximum content of the active substance which is predominantly determined by the physical properties of the latter, as can readily be seen if one takes into account the temperatures, electrostatic charges of the material being ground, and similar factors, which arise on dry grinding.

As an object of the present invention, a process for the manufacture of storable highly concentrated pesticides has now been found which is characterised in that a preferably aqueous suspension of the active substance is ground to a particle fineness of less than about 44 $\mu$ ( = 350 mesh) in the presence of s surface-active substance as well as optionally of an inert substance or carrier and optionally of further formulation additives (wet grinding), that the material is spray-dried, appropriately by means of two-substance nozzles, under a dry gas at 60° – 200°C, preferably 60° – 120°C, and an atomisation air pressure of 2 – 6 atmospheres excess, preferably 3.5 – 5 atmospheres excess, or by centrifugal atomization by means of a vaned wheel and that subsequently about 0.2 – 3 percent of a hignly dispersed carrier as well as further formulation additives for highly concentrated wettable powders are optionally admixed to the dry material.

Suitable active substances for the present process are all insecticides, acaricides, herbicides, fungicides or the like which can be suspended and are hence amenable to wet grinding. Such products are frequently not well suited to dry grinding because of their softness.

Another object of the invention are new compositions of matter in the form of storable wettable powder pre-concentrates comprising about 90 percent and above of a pesticide active substance in conjunction with about 0.05 to 5 percent of a surfactant, and optionally a carrier for the remainder, in a particle size of <44$\mu$ ( = 350 mesh).

The following may for example serve as a surface-active substances: dried sulphite cellulose waste lye, sodium dinaphthylmethane-disulphonate, sodium dibutylnaphthalene-sulphonate, partially saponified polyvinyl acetates, sodium oleylmethyltauride, alkylbenzenesulphates, alkylbenzene-sulphonates, alkyl sulphates, alkyl sulphonates, sodium salts of sulphosuccinic acid esters or of alkylphenylpolyglycol sulphuric acid esters, dextrins, blood albumins, and skimmed milk powder.

Suitable carriers for the present process are for example kieselgur, clays, bentonites and highly dispersed silica.

The addition of small quantities, that is to say about 0.05 – 5 percent, of surface-active substances facilitates grinding, reduces the agglomeration of the grinding suspension and facilitates atomisation into smaller droplets, thereby reducing the drying time. The drying path of the droplet is therefore short, that is to say the drying tower can be correspondingly low.

Grinding mills, which are used in the form of agitator mills, sand mills or ball mills, are suitable for the wet grinding of the active substance suspension, in accordance with the invention, down to a particle fineness of <44$\mu$.

The fine dry material from the spray drying, which according to the invention is obtained with a high content of active substance, is characterised in that its fine particles are each encapsulated by the surface-active material used. It is either a pre-concentrate — having an active substance content of 90 percent and above — for use in the manufacture of a wettable powder in, for example, cross-beater mills or the like, whilst further adding locally occurring economically easily accessible inert substances of the most diverse nature, for example kieselgur or quartz flour as well as further, surface-active, substances, for example wetting agents or dispersing agents, or it is already such a wettable powder whose active substance content of about 65 – 80 percent is conspicuously high.

In this way the present invention solves the problem of making available, in technically less developed areas, highly concentrated starting mixtures of pesticides which after appropriate addition of formulation additives, which are in each case locally available and the prospecties of which are less critical and after grinding in ordinary cross-beater mills, yield wettable powders. These can have a far higher active sustance content than is the case with pesticides obtainable in the usual manner by dry grinding.

As has been mentioned it is also possible, as can be seen from the examples, to manufacture wettable powder formulations directly by the process according to the invention.

The process products having an active substance content of 90 – 99.5 percent, and the wettable powders manufactured therefrom, are storable for 2 – 3 months at 50°C, which as a rule corresponds to a storability of 2 – 3 years at normal temperatures. Thus, these compounds meet the standards set up by the World Health Organisation.

Quite generally, the so-called wettable powders manufactured from the pre-concentrates of the invention with grinding on a simple cross-beater mill show a high active substance stability, as is evident from a comparison, below, with a wettable powder manufactured by very fine grinding in the conventional dry manner, which contains the same quantities of formulation components.

The process according to the invention will be explained in relation to the schematic sketch.

DESCRIPTION OF PROCESS (SEE SKETCH)

The plant protectine, active substance is mixed via a metering disc 1, with addition of an approximately three-fold quantity of water, with a surface-active agent as well as with an inert substance in container 2; the mixture is pumped into a ball mill 3 for wet grinding, is collected from there in a stirred container 4 and is fed via the pump 5 to the spray nozzle or vaned wheel for centrifugal atomization 6.

For spray drying, the fresh air drawn in by means of a fan 7 is directly heated to 60°– 200°C, preferably 60° – 120°C, by means of an oil burner 8 and is passed to the drying tower 10. The wet material is sprayed from a pipeline 9 by means of the two-substance nozzle or two-substance nozzle, using compressed air at 2 – 6 atmospheres excess, preferably 3.5 – 5 atmospheres excess, or a vaned wheel for centrifugal atomization 6 and is passed through the drying tower 10, with dry gas passing in the same direction.

The dry material is separated from the gas at the base of the drying tower 10 and by means of cyclones 11 and is fed to the filling operation 13 via the post-mixer 12.

EXAMPLE 1

A 20 percent strength aqueous suspension of 99.7 parts by weight of pentachloronitrobenzene $$\text{Cl}_5\text{C}_6\text{NO}_2$$

and 0.3 parts by weight of sodium oleylmethyltauride is "wet" ground in an agitator mill, sprayed by means of a two-substance displacement nozzle, using compressed air at 4 – 5 atmospheres excess, and dried by means of air at 110° – 120°C.

Thereafter 0.2 – 0.3 parts by weight of highly disperse silica are admixed.
Particle size distribution:

| 0.3 % | >44μ |
| 4.0 % | >33μ |
| 80.0 % | 20 – 33μ |
| 16.0 % | <20μ |

After a storage of 3 months at 50°C the wettable powder pre-concentrate does not show any agglomerations.

The total floatability of the 75 percent strength wettable powder manufactured therefrom, that is to say of the total mixture, is 80 percent after 30 minutes. The mixture has the following composition:

- 75.4 parts by weight of the above pre-concentrate (99.7 percent strength)
- 3 parts by weight of sodium oleylmethyltauride
- 21.6 parts by weight of kieselgur A commercially available wettable powder containing the same active substance at a concentration of 75 percent requires the constituents of the formulation to be ground dry 2 – 3 times on high performance mills.

EXAMPLE 2

A mixture of 96 parts by weight of linuron $$\text{Cl}_2\text{C}_6\text{H}_3-\text{NH}-\text{CO}-\text{N}(\text{CH}_3)(\text{OCH}_3)$$

- 2 parts by weight of kieselgur
- 1.45 parts by weight of sodium naphthalenesulphonate
- 0.5 parts by weight of partially saponified polyvinyl acetate, and
- 0.05 parts by weight of sodium oleylmethyltauride, processed into a wettable powder pre-concentrate according to Example 1, by wet grinding and spray drying at 120°C, shows 99.4 percent to have a particle size of <44μ. Moisture content: 0.2 percent.

The further formulation of the above pre-concentrate may be effected to give an 80 percent strength wettable powder by adding further quantities of inert substances and wetting agents and grinding the whole in a cross-beater mill. The total floatability of the wettable powder is 71 percent. It has the following composition:

- 83.2 parts by weight of the above pre-concentrate (96 percent strength)
- 0.05 parts by weight of sodium oleylmethyltauride
- 1.0 parts by weight of sodium hydrogen carbonate
- 6.0 parts by weight of sodium dinaphthylmethanedisulphonate
- 1.5 parts by weight of partially saponified polyvinyl acetate
- 8.25 parts by weight of finely disperse silica

EXAMPLE 3

A mixture of 80.0 parts by weight of linuron $$\text{Cl}-\text{C}_6\text{H}_4-\text{NH}-\text{CO}-\text{N}(\text{CH}_3)(\text{OCH}_3)$$

- 9.0 parts by weight of kieselgur
- 9.4 parts by weight of sodium naphthalenesulphonate
- 1.5 parts by weight of partially saponified polyvinyl acetate
- 0.1 parts by weight of sodium oleylmethyltauride is subjected to wet grinding and spray drying at 120°C in accordance with Example 1 and subsequently mixed with 3 parts by weight of highly absorptive silica. The total floatability of the product is 70 percent. The particle size of the process product is 99.7 % <44μ.

The process product can be directly used as a wettable powder.

Hitherto a linuron preparation could only be ground dry with active substance contents of up to 50 percent, since the grinding plant otherwise became smeary.

EXAMPLE 4

92.50 parts by weight of monolinuron $$\text{Cl}-\text{C}_6\text{H}_3\text{Cl}-\text{NH}-\text{CO}-\text{N}(\text{CH}_3)(\text{OCH}_3)$$

- 6.05 parts by weight of Kieselgur
- 1.25 parts by weight of partially saponified polyvinyl acetate
- 0.20 parts by weight of Na salt of a naphthalenesulphonic acid are processed as in Example 1. In this case the addition of a carrier substance after spray drying is unnecessary.

The particle size of the process product is 99.5 % <44μ.

An 80 percent strength wettable powder can be formulated from the dry substance by adding highly disperse silica, sodium hydrogen carbonate and sodium naphthalenesulphonate whilst grinding in a beater mill.

The total floatability of the wettable powder is 86.9 percent. It has the following composition:

86.7 parts by weight of pre-concentrate (92.5 percent strength)
3.0 parts by weight of partially saponified polyvinyl acetate
2.0 parts by weight of sodium hydrogen carbonate
0.5 parts by weight of sodium alkylnaphthalenesulphonate
7.8 parts by weight of finely disperse silica A commercial monolinuron preparation shows an active substance content of 50 percent.

EXAMPLE 5

92 parts by weight of triphenyl tin acetate $(C_6H_5)_3 \cdot Sn \cdot O \cdot OC \cdot CH_3$
6 parts by weight of chalk
2 parts by weight of sodium naphthalenesulphonate are subjected to wet grinding and spray drying at 100°C in accordance with Example 1. The addition of an inert substance after spray drying is unnecessary. The particle size of the process product is 98.4 % <44μ, and the particle size of the wettable powder after adding 0.3 parts by weight of highly disperse silica and storing for 3 months at 50°C is 98 % <44μ.

parts by weight of highly disperse silica are added to the dry material.

The wettable powder pre-concentrate thus obtained is still freeflowing after 2 months at 50°C. It is suitable, in the formulation given below, for the manufacture of a wettable powder by grinding the formulation constituents in a cross-beater mill:

83.0 parts by weight of the above pre-concentrate
10.3 parts by weight of silica
2.2 parts by weight of ammonia sulphate
1.5 parts by weight of sodium naphthalenesulphonate
3.0 parts by weight of partially saponified polyvinyl acetate Total floatability of the wettable powder: 81.5 percent.

EXAMPLE 7

96.0 parts by weight of 3,3'-ethylene-bis(tetrahydro-4,6-dimethyl-2-H-1,3,5-thiadiazine-2-thione)

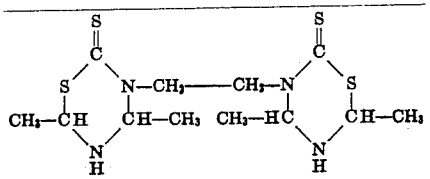

COMPARISON EXPERIMENT

Compositions:

| a) Wettable powder obtained from the pre-concentrate according to the invention | b) Wettable powder obtained by conventional dry grinding |
|---|---|
| 65 parts by weight of triphenyl tin acetate pre-concentrate (see above) | 60 parts by weight of triphenyl tin acetate |
| 20 parts by weight of manganese-ethylene-bis-dithiocarbamate | 20 parts by weight of manganese-ethylene-bis-dithiocarbamate |
| 4.75 parts by weight of sodium naphthalenesulphonate | 6 parts by weight of sodium naphthalenesulphonate |
| 3 parts by weight of sodium alkylnaphthalenesulphonate | 3 parts by weight of sodium alkylnaphthalenesulphonate |
| 2 parts by weight of partially saponified polyvinyl acetate | 2 parts by weight of partially saponified polyvinyl acetate |
| 4.75 parts by weight of chalk | 8.5 parts by weight of chalk |
| 0.50 parts by weight of highly disperse silica | 0.5 parts by weight of highly disperse silica |

The total floatability of each wettable powder is 82 – 85 percent. The loss of active substance ( % absolute) after 3 months' storage at 50°C is:

|  | Formulation *a* | Formulation *b* |
|---|---|---|
| Triphenyl tin acetate | 2 % | 9 % |
| Manganese-ethylene-bis-dithiocarbamate | 0.8 % | 8 – 10 % |

EXAMPLE 6

92.0 parts by weight of endosulfan

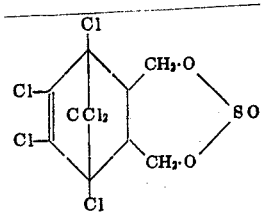

7.0 parts by weight of kieselgur
0.6 parts by weight of sodium naphthalenesulphonate
0.4 parts by weight of partially saponified polyvinyl acetate are subjected to wet grinding and spray drying in accordance with the process of Example 1. Thereafter 2.0

3.5 parts by weight of kieselgur
0.5 parts by weight of sodium naphthalenesulphonate are subjected to wet grinding and spray drying in accordance with the process of Example 1. A 75 percent strength wettable powder is obtained by mixing the pre-concentrate thus obtained with formulation additives (polypropylene glycol, sodium naphthalenesulphonate, further quantities of kieselgur and silica). Its total floatability is 85 percent; after 2 months' storage at 50°C it is 80 percent.

EXAMPLE 8

80.0 parts by weight of the active substance of Example 7
2.0 parts by weight of partially saponified polyvinyl acetate
7.0 parts by weight of sodium naphthalenesulphonate
0.5 parts by weight of polypropylene glycol
10.3 parts by weight of kieselgur are subjected to the process according to Example 1 by wet grinding and spray drying.

Thereafter 0.3 parts by weight of highly disperse silica are added to the pre-concentrate thus obtained and a 75 percent strength wettable powder is obtained.

The total floatability of the wettable powder is 83 percent, and is 80.3 percent after 3 months storage at 50°C.

EXAMPLE 9

95.0 parts by weight of binapacryl

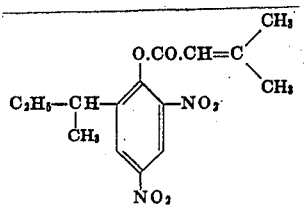

4.5 parts by weight of kieselgur
0.5 parts by weight of sodium naphthalenesulphonate are ground wet as described under Example 1 and are subjected to spray drying at 70° – 78°C. On mixing the pre-concentrate thus obtained with formulation additives a wettable powder of the following composition is obtained:

78.8 parts by weight of the above pre-concentrate (95 percent strength)
10.0 parts by weight of kieselgur
1.2 parts by weight of partially saponified polyvinyl acetate
10.0 parts by weight of dried sulphite cellulose waste lye.

The total floatability of this 75 percent strength wettable powder is 80 percent.

The degradation of active substance to free dinitro-sec.-butyl-phenol after 3 months' storage at 50°C is only 0.1 percent.

The stabilising effect resulting from the use of a high-strength concentrate according to the invention is apparent from the following.

If a 50 percent strength Binapacryl wettable powder which has been manufactured in the conventional dry manner by very fine grinding on high performance mills, and which cannot be manufactured at a higher concentration in this manner, is compared with a wettable powder, again of 50 percent strength, formulated from the Binapacryl pre-concentrate according to the invention by grinding on a simple cross beater mill and in other respects containing the same formulation constituents, then 2.5 percent of free dinitro-sec.-butylphenol are present in the conventional wettable powder after 3 months storage at 50°C, whilst the wettable powder made from the pre-concentrate according to the invention only contains 0.3 – 0.4 percent.

Since phytotoxic damage to the treated plants occurs at contents of free dinitro-sec.-butylphenol of more than 0.6 percent, the active substance can, in the present case, only be employed - without the use of an additional stabiliser — through the pre-concentrate according to the invention.

What is claimed is:

1. In a process for the manufacture of storable, wettable powder preconcentrates of pesticides selected from the group consisting of pentachloro-nitro-benzene, linuron, monolinuron, triphenyltin acetate, manganese ethylene-bis-dithiocarbamate, endosulfan and binapacryl, the preconcentrate containing about 90 percent of the active compound, the improvement consisting essentially of grinding an aqueous suspension of said pesticides, in the presence of 0.05 to 5 percent of a surface-active agent selected from the group consisting of dried sulphite cellulose waste liquor, sodium dinaphthylmethane disulphonate, sodium dibutylnaphthalene sulphonate, partially saponified polyvinylacetates, sodium oleylmethyltauride, alkylbenzene sulphates, alkylbenzene sulphonates, sodium salts of sulphosuccinic acid esters, sodium salts of alkylphenylpolyglycol sulphuric acid esters, dextrins, blood albumins, and skimmed milk powder and, optionally, a carrier selected from the group consisting of kieselguhr, a clay, a bentonite, and highly dispersed silica, wherein said grinding is carried out until a particle size of said pesticides of $<44\mu$ is achieved and spray drying the thus ground material with a dry gas at 60° to 120°C, using an atomization air pressure of 3.5 to 5 atmospheres gauge.

2. The process according to claim 1 wherein the spray drying of the wet-ground powder is via centrifugal atomization.

3. The process according to claim 1 wherein the spray drying of the wet ground powder is at 3.5 to 5 atmospheres gauge in a dry gas at 60° to 120°C.

4. The process as defined in claim 1 wherein subsequent to spray drying, 0.2 to 3.0 percent of highly dispersed silica is added to the dry material.

5. A wettable powder pre-concentrate prepared according to claim 1 in which the pesticidally active compound is selected from the group consisting of: pentachloronitrobenzene, linuron, monolinuron, triphenyltinacetate, endosulfan and binapacryl.

6. A wettable powder pre-concentrate prepared according to claim 1, in which the pesticidally active compound is pentachloronitrobenzene.

7. A wettable powder pre-concentrate prepared according to claim 1 in which the pesticidally active compound is linuron.

8. A wettable powder pre-concentrate prepared according to claim 1, in which the pesticidally active compound is monolinuron.

9. A wettable powder pre-concentrate prepared according to claim 1 in which the pesticidally active compound is triphenyltinacetate.

10. A wettable powder pre-concentrate prepared according to claim 1 in which the pesticidally active compound is endosulfan.

11. A wettable powder pre-concentrate prepared according to claim 1, in which the pesticidally active compound is 3,3'-methylene-bis(tetrahydro-4,6-dimethyl-2-N-1,3,5-thiadiazine-2-thione).

12. A wettable powder pre-concentrate prepared according to claim 1 in which the pesticidally active compound is binapacryl.

* * * * *